(12) United States Patent
Laaksonen et al.

(10) Patent No.: US 11,570,564 B2
(45) Date of Patent: Jan. 31, 2023

(54) GROUPING AND TRANSPORT OF AUDIO OBJECTS

(71) Applicant: NOKIA TECHNOLOGIES OY, Espoo (FI)

(72) Inventors: Lasse Laaksonen, Tampere (FI); Mikko Tammi, Tampere (FI); Miikka Vilermo, Siuro (FI); Arto Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/753,698

(22) PCT Filed: Sep. 24, 2018

(86) PCT No.: PCT/FI2018/050686
§ 371 (c)(1),
(2) Date: Apr. 3, 2020

(87) PCT Pub. No.: WO2019/068959
PCT Pub. Date: Apr. 11, 2019

(65) Prior Publication Data
US 2020/0275230 A1 Aug. 27, 2020

(30) Foreign Application Priority Data
Oct. 4, 2017 (GB) ...................... 1716192

(51) Int. Cl.
*H04S 7/00* (2006.01)
*G10L 19/008* (2013.01)
*G10L 19/022* (2013.01)

(52) U.S. Cl.
CPC .............. *H04S 7/30* (2013.01); *G10L 19/008* (2013.01); *G10L 19/022* (2013.01)

(58) Field of Classification Search
CPC ..... G10L 19/008; G10L 19/167; G10L 19/20; G10L 19/22; H04S 3/008; H04S 2420/03; H04S 2400/01; H04S 3/02; H04S 2400/11
(Continued)

(56) References Cited

U.S. PATENT DOCUMENTS 7,636,448 B2 * 12/2009 Metcalf ................... H04S 3/002
  381/118
8,947,493 B2 * 2/2015 Lian ........................ H04N 7/15
  348/14.08
(Continued)

FOREIGN PATENT DOCUMENTS

EP 2 925 024 A1 9/2015
EP 3 264 259 A1 1/2018
(Continued)

OTHER PUBLICATIONS

3GPP TR 26.918 V15.0.0 (Sep. 2017) 3$^{rd}$ Generation Partnership Project; Technical Specification Group Services and System Aspects; Virtual Reality (VR) media services over 3GPP (Release 15) (dated Sep. 2017) 94 pages.
(Continued)

*Primary Examiner* — Alexander Krzystan
(74) *Attorney, Agent, or Firm* — Alston & Bird LLP

(57) ABSTRACT

An apparatus for audio signal processing audio objects within at least one audio scene, the apparatus comprising at least one processor configured to:define for at least one time period at least one contextual grouping comprising at least two of a plurality of audio objects and at least one further audio object of the plurality of audio objects outside of the at least one contextual grouping, the plurality of audio objects within at least one audio scene; anddefine with respect to the at least one contextual grouping at least one first parameter and/or parameter rule type which is config-
(Continued)

ured to be applied with respect to a common element associated with the at least two of the plurality of audio objects and wherein the at least one first parameter and/or parameter rule type is configured to be applied with respect to individual element associatedwith the at least one further audio object outside of the at least one contextual grouping, the at least one first parameter and/or parameter rule type being applied in audio rendering of both the at least two of the plurality of audio objects and the at least one further audio object.

19 Claims, 12 Drawing Sheets

(58) Field of Classification Search
USPC .................................. 381/310, 22, 304, 306
See application file for complete search history.

(56) References Cited

U.S. PATENT DOCUMENTS

| | | | |
|---|---|---|---|
| 9,609,383 | B1 | 3/2017 | Hirst |
| 2010/0223552 | A1 | 9/2010 | Metcalf |
| 2013/0114819 | A1 | 5/2013 | Melchior et al. |
| 2014/0023196 | A1 | 1/2014 | Xiang et al. |
| 2014/0324200 | A1 | 10/2014 | Chen |
| 2015/0332680 | A1 | 11/2015 | Crockett et al. |
| 2016/0021479 | A1 | 1/2016 | Lambourne et al. |
| 2016/0073215 | A1 | 3/2016 | De Bruijn et al. |
| 2016/0329872 | A1 | 11/2016 | Dizon et al. |
| 2017/0031648 | A1 | 2/2017 | So et al. |
| 2018/0310116 | A1* | 10/2018 | Arteaga ............... H04N 13/204 |
| 2018/0324542 | A1 | 11/2018 | Seo et al. |
| 2018/0338213 | A1* | 11/2018 | Lehtiniemi ............. H04S 7/303 |
| 2019/0180731 | A1* | 6/2019 | Leppanen ............... H04S 7/306 |
| 2020/0275230 | A1* | 8/2020 | Laaksonen ............ G10L 19/008 |
| 2021/0191790 | A1* | 6/2021 | Gogate ................ G06K 9/6218 |

FOREIGN PATENT DOCUMENTS

| | | |
|---|---|---|
| WO | WO 2014/187991 A1 | 11/2014 |
| WO | WO 2016/209607 A1 | 12/2016 |
| WO | WO 2017/126895 A1 | 7/2017 |

OTHER PUBLICATIONS

VR Industry Forum (VRIF) Draft Guidehnes, Version 0.0draft010. dated Sep. 12, 2017, pp. 1-68.

Text of White Paper on MPEG Technology: Spatial Audio Object Coding, Audio Subgroup, ISO/IEC JTC1/SC29/WG11. MPEG2015/N15820. (Oct. 2015) 8 pages.

Herder, J., *Visualization of a Clustering Algorithm of Sound Sources Based on Localization Errors Available*, Second International Conference on Human and Computer (Sep. 1999) 22:1-5.

International Search Report and Written Opinion for Application No. PCT/FI2018/050686 dated Dec. 18, 2018, 17 pages.

Search Report for United Kingdom Application No. GB1716192.8 dated Mar. 12, 2018, 1 page.

* cited by examiner

GROUPING AND TRANSPORT OF AUDIO OBJECTS

CROSS-REFERENCE TO RELATED APPLICATIONS

This application is a national stage entry of International Patent Application No. PCT/FI2018/050686, filed on Sept. 24, 2018, which claims priority to and the benefit of United Kingdom Application No. 1716192.8, filed on Oct. 4, 2017, each of which is incorporated herein by reference in its entirety.

FIELD

The present application relates to apparatus and methods for contextual grouping and transport of audio objects with respect to audio signal processing.

BACKGROUND

Virtual reality (VR) generally refers to various capture and rendering technologies for generating realistic images and sounds that replicate a real or imaginary environment, and simulate a user's physical presence in this environment. We may refer to this environment as a content consumption space.

The way a user may move within a 3D space may be defined as motion in six degrees of freedom. This movement is divided into two categories: rotational and translational movement (with three degrees of freedom each). Rotational movement is sufficient for a simple VR experience where the user may turn their head (pitch, yaw, and roll) to experience the space from a static or automatically moving point. Translational movement means that the user may also change the position within in the space and thus their position with respect to the rendering of the audio, i.e., move along the x, y, and z axes according to her wishes.

Augmented reality (AR) shares many similarities with VR. Typically it refers to a direct or indirect view of a physical, real-world environment to which computer-generated sensory input such as sound and graphics is added. Mixed reality (MR) is a term that is used to cover various levels of virtuality of the reality-virtuality spectrum. For most purposes, in the context of the current invention, all these terms may be used interchangeably.

Rendering of six-degrees-of-freedom (6DoF) audio, which is also known as free-viewpoint or free-listening point audio is a rapidly developing field. Specifically the application of audio rendering controlled by the user (for example the user's head rotation and location in the audio content space) for AR/VR audio is complex and new field. This spatial audio may consist of, for example, a channel-based bed and audio objects, audio objects only, or any equivalent spatial audio representation. It is understood that the audio sources may themselves be dynamic as well as the user. Thus for example the audio source 'default' location in the 3D space may be time-variant.

Object-based audio has many meanings. For example, in the traditional broadcast domain, object-based audio is utilized to offer a broader range of personalization options for the consumer. In this context, a typical audio element delivered as an audio object is dialogue. This may allow, for example, selecting a specific language version or a sports commentary association with one of the competing teams.

With respect to 6DoF free-viewpoint audio, audio objects may be understood as dynamic audio (sources) with various properties and, very importantly, a rendering location. Thus, it is the definition of the audio object locations, or an equivalent spatial audio representation, that allow for the user as a listener to move around a specific audio, go close to it, distance themselves from it, and so on. The movement of the user therefore affects the way an audio is rendered. For example the perceived loudness related to an audio object may depend largely on the distance between the user and the audio object.

This is shown in figures 1a and 1b which illustrates an example where a user moves in a 6DoF content consumption space 100. FIG. 1a illustrates the user at a position 111 and approaching an area with three audio objects 101, 103, 105, where a first object 105 has become audible to the user. Figure 1b illustrates the user moving along a path 121 to a location 113 in the space towards the centre of the three audio objects 101, 103, 105. The user at location 113 is able to hear all of the audio objects 101, 103, 105 when at this rendering location, each from their correct spatial direction. Furthermore the rendered audio is such that the relative volume level of each object depends on the user's distance to the respective audio source.

The application of 6DoF audio rendering in AR/VR systems however can be problematic and result in poor quality audio outputs and which produce inconsistent results.

SUMMARY

According to a first aspect there is provided a method comprising: defining for at least one time period at least one contextual grouping comprising at least two of a plurality of audio objects and at least one further audio object of the plurality of audio objects outside of the at least one contextual grouping, the plurality of audio objects within at least one audio scene; and defining with respect to the at least one contextual grouping at least one first parameter and/or parameter rule type which is configured to be applied with respect to a common element associated with the at least two of the plurality of audio objects and wherein the at least one first parameter and/or parameter rule type is configured to be applied with respect to individual element associated with the at least one further audio object outside of the at least one contextual grouping, the at least one first parameter and/or parameter rule type being applied in audio rendering of both the at least two of the plurality of audio objects and the at least one further audio object.

The method may further comprise: defining with respect to the at least one contextual grouping at least one second parameter and/or parameter rule type configured to be applied with respect to individual elements associated with the at least two of the plurality of audio objects in audio rendering of the at least two of the plurality of audio objects; and defining the at least one second parameter and/or parameter rule type is configured to be applied with respect to individual elements associated with the at least one further audio object of the plurality of audio objects outside of the at least one contextual grouping.

The method may further comprise: defining for at least one further time period at least one further contextual grouping comprising a further at least two of the plurality of audio objects; and defining with respect to the at least one further contextual grouping at least one further first parameter and/or parameter rule type which is configured to be applied with respect to a further common element associated with the further at least two of the plurality of audio objects in audio rendering of the further at least two of the plurality of audio objects.

The at least two of the plurality of audio objects and the further at least two of the plurality of audio objects may comprise at least one audio object in common.

The at least one first time period may be at least one of: separate from and before the at least one further time period; separate from and after the at least one further time period; partially overlapping the at least one further timer period; within the at least one further time period; and containing the at least one further time period.

The at least one audio object in common may enable a spatial crossfade between the at least one contextual grouping and the at least one further contextual grouping.

The method may further comprise selecting for the at least one object in common one of: the at least one parameter and/or parameter rule type, to be applied with respect to the common element associated with the at least two of the plurality of audio objects; or the at least one further parameter and/or parameter rule type, to be applied with respect to the further common element associated with the further at least two of the plurality of audio objects, based on at least one of: a volume determination; and a prior contextual grouping of the at least one additional contextual grouping and the at least one contextual grouping.

The method may further comprise defining with respect to the at least one contextual grouping the common element as at least one common position or area.

The method may further comprise encoding a downmix of audio signals associated with the at least one contextual grouping based on at least one of: a distance within an audio scene relative to a rendering location; and an orientation of the at least one contextual grouping relative to a rendering location.

The audio rendering may be a six-degrees-of-freedom audio rendering.

The method may further comprise: defining the common element with respect to the at least one contextual grouping; and transmitting and/or storing the defined common element and audio signals associated with the at least two of the plurality of audio objects.

According to a second aspect there is provided a method for rendering audio signals associated with a plurality of audio objects within at least one audio scene, the method comprising: determining for at least one time period at least one contextual grouping comprising at least two of the plurality of audio objects and at least one further audio object of the plurality of audio objects outside of the at least one contextual grouping; and determining with respect to the at least one contextual grouping at least one first parameter and/or parameter rule type; determining at least one common element with respect to the at least one contextual grouping; determining an individual element with respect to the at least one further audio object of the plurality of audio objects outside of the at least one contextual grouping; rendering audio signals associated with the at least two of the plurality of audio objects by applying the at least one first parameter and/or parameter rule type with respect to the common element to audio signals associated with the at least two of the plurality of audio objects; rendering audio signals associated with the at least one further audio object of the plurality of audio objects outside of the at least one contextual grouping by applying the at least one first parameter and/or parameter rule type with respect to the individual element to audio signals associated with the at least one further audio object; and combining the rendering of audio signals associated with the at least two of the plurality of audio objects with the rendering of audio signals associated with the at least one further audio object of the plurality of audio objects outside of the at least one contextual grouping.

The method may further comprise: determining at least one second parameter and/or parameter rule type; rendering audio signals associated with the at least two of the plurality of audio objects and the at least one further audio object of the plurality of audio objects outside of the at least one contextual grouping by applying the at least one second parameter and/or parameter rule type with respect to individual elements associated with each audio object to audio signals associated with each audio object; and combining rendering audio signals associated with the at least two of the plurality of audio objects and the at least one further audio object of the plurality of audio objects outside of the at least one contextual grouping with the combined rendering.

The method may further comprise determining the common element as at least one common position or area.

The method may further comprising determining a downmix of audio signals associated with the at least one contextual grouping, wherein applying the at least one first parameter and/or parameter rule type with respect to the common element to audio signals associated with the at least two of the plurality of audio objects may comprise applying the at least one first parameter and/or parameter rule type with respect to the common element to the downmix of audio signals associated with the at least two of the plurality of audio objects.

According to a third aspect there is provided an apparatus for audio signal processing audio objects within at least one audio scene, the apparatus comprising at least one processor configured to: define for at least one time period at least one contextual grouping comprising at least two of a plurality of audio objects and at least one further audio object of the plurality of audio objects outside of the at least one contextual grouping, the plurality of audio objects within at least one audio scene; and define with respect to the at least one contextual grouping at least one first parameter and/or parameter rule type which is configured to be applied with respect to a common element associated with the at least two of the plurality of audio objects and wherein the at least one first parameter and/or parameter rule type is configured to be applied with respect to individual element associated with the at least one further audio object outside of the at least one contextual grouping, the at least one first parameter and/or parameter rule type being applied in audio rendering of both the at least two of the plurality of audio objects and the at least one further audio object.

The at least one processor may be further configured to: define with respect to the at least one contextual grouping at least one second parameter and/or parameter rule type configured to be applied with respect to individual elements associated with the at least two of the plurality of audio objects in audio rendering of the at least two of the plurality of audio objects; and define the at least one second parameter and/or parameter rule type is configured to be applied with respect to individual elements associated with the at least one further audio object of the plurality of audio objects outside of the at least one contextual grouping.

The at least one processor may be further configured to: define for at least one further time period at least one further contextual grouping comprising a further at least two of the plurality of audio objects; and define with respect to the at least one further contextual grouping at least one further first parameter and/or parameter rule type which is configured to be applied with respect to a further common element associated with the further at least two of the plurality of audio objects in audio rendering of the further at least two of the plurality of audio objects.

The at least two of the plurality of audio objects and the further at least two of the plurality of audio objects may comprise at least one audio object in common.

The at least one first time period may be at least one of: separate from and before the at least one further time period; separate from and after the at least one further time period; partially overlapping the at least one further timer period; within the at least one further time period; and containing the at least one further time period.

The at least one audio object in common may enable a spatial crossfade between the at least one contextual grouping and the at least one further contextual grouping.

The processor may be further configured to select for the at least one object in common one of: the at least one parameter and/or parameter rule type, to be applied with respect to the common element associated with the at least two of the plurality of audio objects; or the at least one further parameter and/or parameter rule type, to be applied with respect to the further common element associated with the further at least two of the plurality of audio objects, based on at least one of: a volume determination; and a prior contextual grouping of the at least one additional contextual grouping and the at least one contextual grouping.

The processor may be further configured to define with respect to the at least one contextual grouping the common element as at least one common position or area.

The processor may be further configured to encode a downmix of audio signals associated with the at least one contextual grouping based on at least one of: a distance within an audio scene relative to a rendering location; and an orientation of the at least one contextual grouping relative to a rendering location.

The audio rendering may be six-degrees-of-freedom audio rendering.

The processor may be further configured to: define the common element with respect to the at least one contextual grouping; and transmit and/or store the defined common element and audio signals associated with the at least two of the plurality of audio objects.

According to a fourth aspect there is provided an apparatus for rendering audio signals associated with a plurality of audio objects within at least one audio scene, the apparatus comprising at least one processor configured to: determine for at least one time period at least one contextual grouping comprising at least two of the plurality of audio objects and at least one further audio object of the plurality of audio objects outside of the at least one contextual grouping; and determine with respect to the at least one contextual grouping at least one first parameter and/or parameter rule type; determine at least one common element with respect to the at least one contextual grouping; determine an individual element with respect to the at least one further audio object of the plurality of audio objects outside of the at least one contextual grouping; render audio signals associated with the at least two of the plurality of audio objects by applying the at least one first parameter and/or parameter rule type with respect to the common element to audio signals associated with the at least two of the plurality of audio objects; render audio signals associated with the at least one further audio object of the plurality of audio objects outside of the at least one contextual grouping by being configured to apply the at least one first parameter and/or parameter rule type with respect to the individual element to audio signals associated with the at least one further audio object; and combine the rendered audio signals associated with the at least two of the plurality of audio objects with the rendered audio signals associated with the at least one further audio object of the plurality of audio objects outside of the at least one contextual grouping.

The processor may be further configured to: determine at least one second parameter and/or parameter rule type; render audio signals associated with the at least two of the plurality of audio objects and the at least one further audio object of the plurality of audio objects outside of the at least one contextual grouping by being configured to apply the at least one second parameter and/or parameter rule type with respect to individual elements associated with each audio object to audio signals associated with each audio object; and combine rendered audio signals associated with the at least two of the plurality of audio objects and the at least one further audio object of the plurality of audio objects outside of the at least one contextual grouping with the combined rendering.

The processor may be further configured to determine the common element as at least one common position or area.

The processor may be further configured to determine a downmix of audio signals associated with the at least one contextual grouping, wherein the processor configured to apply the at least one first parameter and/or parameter rule type with respect to the common element to audio signals associated with the at least two of the plurality of audio objects may be further configured to apply the at least one first parameter and/or parameter rule type with respect to the common element to the downmix of audio signals associated with the at least two of the plurality of audio objects.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for improving the decoding, rendering and presentation or outputting of six-degree-of-freedom (6DoF) audio.

Figure 1A:
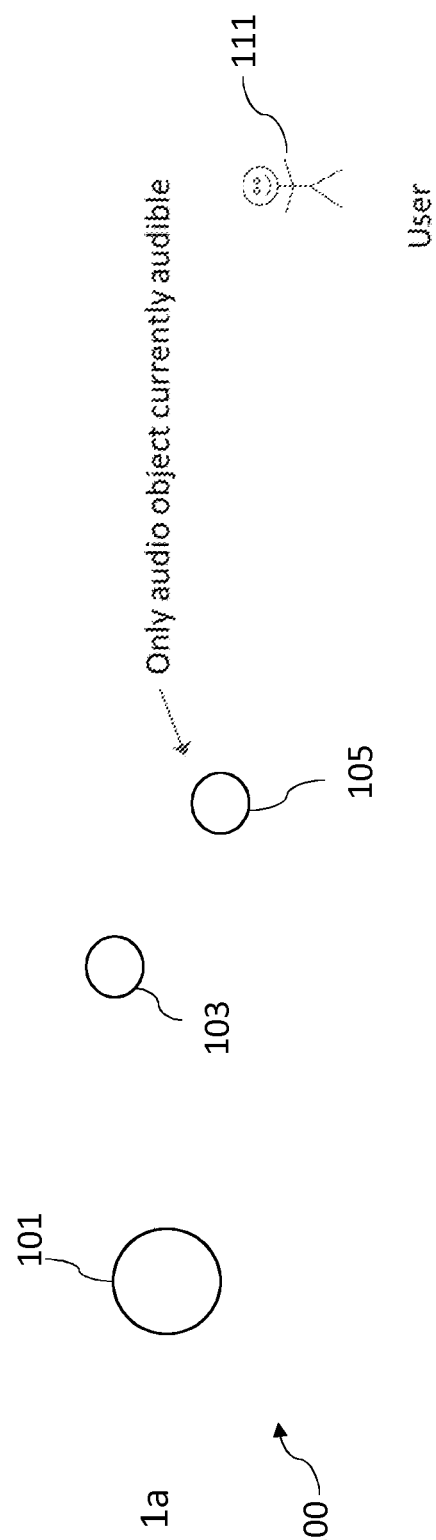
FIGS. 1a, 1b, and 1c show an example six degree of freedom environment in which there are located audio objects and within which the user may 'explore' and the effect of distance between audio object and user is shown.
Figure 1B:
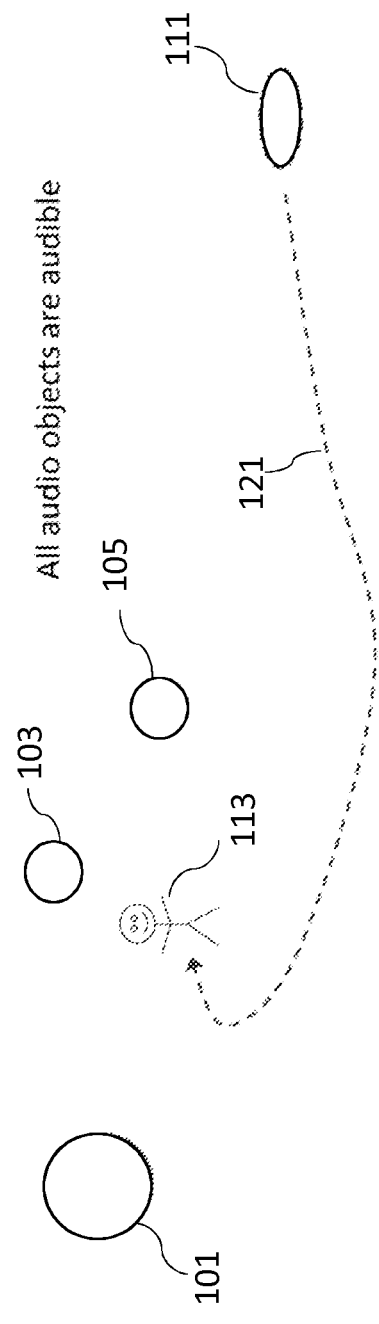
Figure 1C:
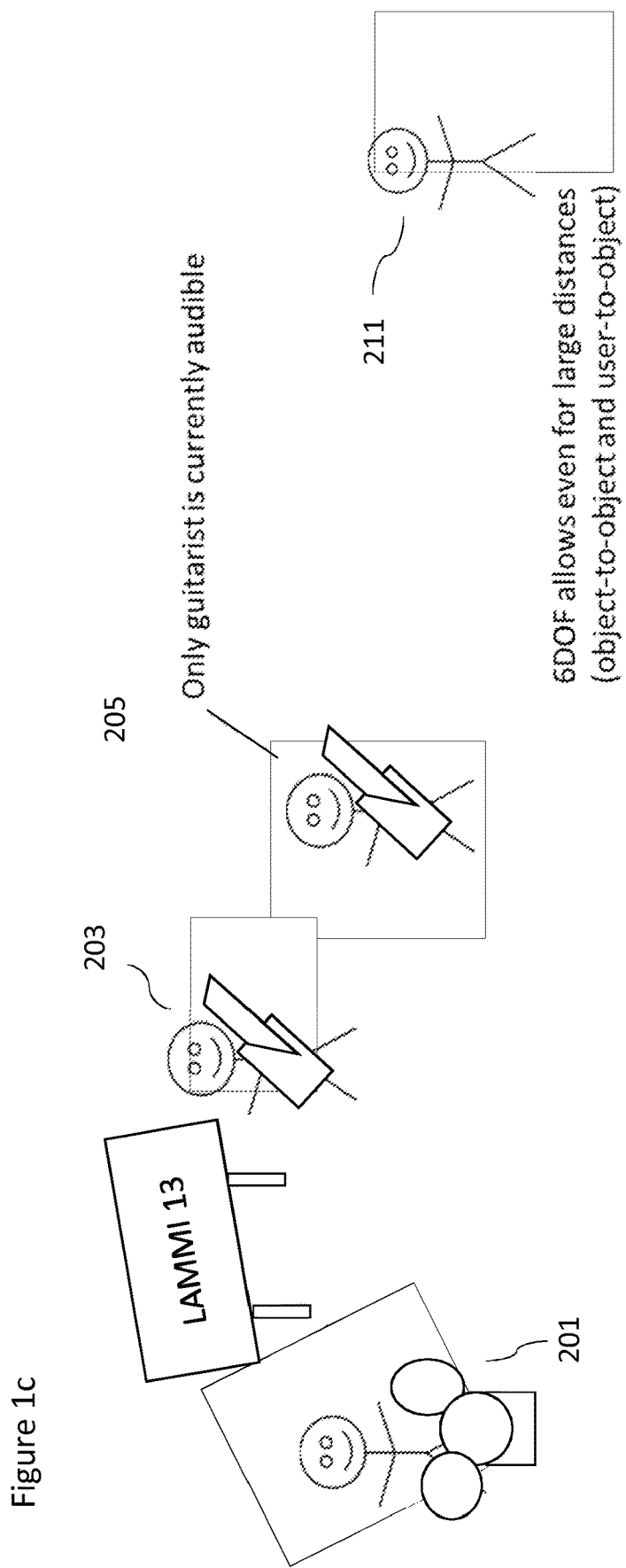

As discussed previously application of 6DoF audio rendering in AR/VR systems however can be problematic and result in poor quality audio outputs and produce inconsistent results. FIG. 1c for example shows an environment similar to FIGS. 1a and 1b, but in this particular case the three audio objects 201, 203, 205 are individual members/instruments of a rock band. It is shown in FIG. 1c that the user 211 may experience the audio system in a way that is not optimal in all use cases when enabled by existing functionality. Thus for example with respect to FIG. 1c the user 211 is able to position themselves such that only the guitarist, audio object reference 205, is currently audible and the other audio objects, bassist 203 and drummer 201 are not audible.

To understand the problem and key aspects of the problem, we will attempt to explain some background in the related technology, arts, and business models. When imagining listening to a live performance in a 6DoF presentation or, particularly, a carefully mixed and produced 6DoF experience (the 6DoF equivalent of a conventional professionally mixed audio single or album), the user will expect to receive a consistent, high-quality experience where the user's movement supports the experience rather than detracts from it. Similarly, the content creators will want the user to have a good experience. The content creator will want their artistic choices to make a difference for the user's experience, and will see it as being vital to have those artistic choices respected. In other words, deviation from the intended presentation will not viewed positively. This is firstly highly important for the content creator/owner (as the composer, artist, mixer, mastering engineer, producer, etc. have all made their contribution).

Secondly, a good experience is important for the end user who will otherwise not feel encouraged to study or explore the scene (defeating at least partly the reason for 6DoF in the first place).

The producers and engineers, taking into consideration current technologies and business models, may for example generate a mix comprising a two-channel presentation of a musical piece, and also define various audio properties such as finding the best-sounding level difference between the guitar and the drum kit tracks.

Similarly, the producers and engineers may place the instruments between the two channels. For example, a guitar may be panned substantially to the left, while a drum kit may be panned slightly less to the right. Such choices affect the end user's ability to hear every note from each instrument. This is achieved, among other decisions, by choices in placement of various audio elements in complementary and unobtrusive positions.

In a generated 6DoF experience, some of that control is taken away from the content creator. The user is not in the traditional sweet spot of listening anymore. The user's ability to roam around and even between the performers will affect both the volume balance and the spatial balance. The user can also put a lot of distance between themselves and the audio or sound sources or alternatively get very close. Comparing to the traditional use case of channel-based audio or music, the user can even be considered to degrade the experience with every step they move away from the 'ideal' mix location. The consistency of experience the content creator expects cannot be achieved if the user moves in the scene and causes various instruments to disappear and then become audible again. Similarly where the balance and overall volume changes significantly during the playback the consistence of the experience may cause the experience to be not as intended, and not be as good as it should be.

In some situations, there can be limitations imposed on the 6DoF experience. For example, the user may not be allowed to move outside a certain area or move from one area into another area. However the concept of a 6DoF experience is one which allows the user to move and experience the music (or whatever content) in a new way. Therefore, there should be as few of artificial limitations as possible. One of the concepts embodied hereafter is the implementation of solutions, where a limitation is employed as an artistic choice rather than just a forced attempt to bring back some of the traditional channel-based music control.

Thus the key problems may be considered with respect to the following questions:

How to enable a 6DoF experience that is as consistent as conventional music mixes yet provide the freedom of exploration?

What tools should the content creator (the producer) have available to make the experience happen?

How can the sweet spot in 6DoF music be enlarged?

A simplified practical problem where a conventional system is utilized for a 6DoF audio experience can be summarised as:

User begins to listen to a musical performance in a 6DoF space. In a first position, the user hears a guitar. This however is not the only audio the content creator has provided. The musical performance has also vocals, a bass guitar, and a drum set. In a first position, the user does not hear these elements. The user moves to a second position, where the user is able to also hear the vocals. The user then moves to a third position, where the user is able to hear the vocals, the bass guitar, and the drums. However, the user does not hear the guitar anymore, and the vocals are very low in volume. Considering a traditional 2-channel mix of the same musical performance, all the instrument tracks are audible to the user all the time at relative volume levels and channel balances specifically sculpted by the mixer and the mastering engineer.

All the while the user moves in the 6DoF space, the audio is however heard from the correct directions. However it is understood simply providing the correct directions and the correct volume behaviour is not the desired experience in all use cases. Therefore, the overall experience is not correct, due to current systems not considering implications of 6DoF, where user position and thus distance is allowed to change relative to the soundfield and its various components.

While the above example discusses volume only, it is understood that other aspects can also exhibit similar problems in 6DoF content consumption.

In the following embodiments the system may be configured in such a manner to enable a "traditional rendering", where the audio scene is presented according to the content provider/producer planned rendering and which is not allowed by current 6DoF systems as well as the "correct rendering" where the audio signals are renderer such that the audio sources are located at the correct location relative to the user within the same 6DoF experience.

In other words the following examples describe a system wherein the audio output is presented such that the listening sweet spot in 6DoF music, and in 6DoF experiences in general, is variable based on the content type and the intention of the content creator. This is significantly more advantageous than implementing an obvious signalling solution such as defining a flag that cuts off distance rendering for volume for the whole presentation.

The concept as presented in the embodiments hereafter is a system and method for modifying a pre-defined (or default) virtual-position based rendering of related audio objects in a 6DoF listening context, where the modification is controlled via a reference point distance or area and a group membership. This modification allows a redefinition of the listening sweet spot for 6DoF audio, where the content (signal) type and the content creator intention can be directly taken into account in adapting and enlarging the sweet spot.

The embodiments as described in further detail hereafter may be based on a contextual grouping of related 6DoF audio objects for balanced playback and efficient transport. This grouping in some embodiments may be implemented either via a user interface (UI) input or following an analysis in an automatic or semi-automatic process. The grouping furthermore allows defining a spatial rendering for the associated audio objects that differs from the rendering of the non-grouped or "free" audio objects.

In some embodiments at least one rendering parameter is applied commonly to the contextual audio-object group. Typically, the at least one parameter is volume. A commonly applied volume parameter thus allows a user to hear the spatial audio components from their correct directions, while maintaining the overall volume-level balance such as defined by the content creator.

Furthermore, the contextual grouping in some embodiments allows for an efficient transport of the audio signals related to the grouped audio objects. This is an additional advantage associated with the embodiments presented herein. In such embodiments a near-field/far-field bitrate-adaptive downmix of the contextual group is defined. This near-field/far-field bitrate-adaptive downmix definition is important as the contextual grouping may require more audio objects to be transmitted to the user in some cases than would be required under conventional 6DoF audio rendering, and because the 6DoF audio signals may be transmitted over bandwidth-limited channels.

In some embodiments, the contextual group is time-variant. For example, an audio object can then belong to a first contextual group at a first time instant, belong to no contextual group at a second time instant, and belong to a second contextual group at a third time instant. This enables in some embodiments the scenario where for a musical experience, two pieces of music take place in a different spatial location. A specific instrument track according to some embodiments may lead a user from a first piece of audio at a first location to a second piece of audio at a second location. To enable this a new type of spatial crossfade, or outro/intro, is thus defined in detail hereafter.

Audio objects in 6DoF systems are rendered based on the (listener) user's position and rotation such as shown above with respect to FIGS. 1a, 1b and 1c. Therefore, a different set of audio objects with different volume balance becomes audible for the user depending on user movement in the content consumption space. As discussed earlier while this approach to rendering provides a realistic audio presentation, and it is therefore preferred in many use cases, it does not provide the desired user experience in all 6DoF use cases.

This was shown for example with respect to the music performance use case of FIG. 1c. With individual band members 201, 203, 205 only becoming audible, and particularly the volume balance significantly changing, depending on user position, the user experience is likely to not be very good. The content creator may thus prefer to maintain a specific volume balance for the musical content and have only the rendering directions change due to the 6DoF audio-object and user movements.

In some embodiments a system may be implemented wherein 6DoF audio objects may be contextually grouped. Applying a contextual grouping to a subset comprising Y of X audio objects results in two separate groups. The Y audio objects form the contextual group and Z (=X−Y) audio objects that remain "free" audio objects. In other words the system is such that the Z audio objects are "free" and there is no change to the conventional 6DoF rendering of the Z audio objects.

Figure 2:
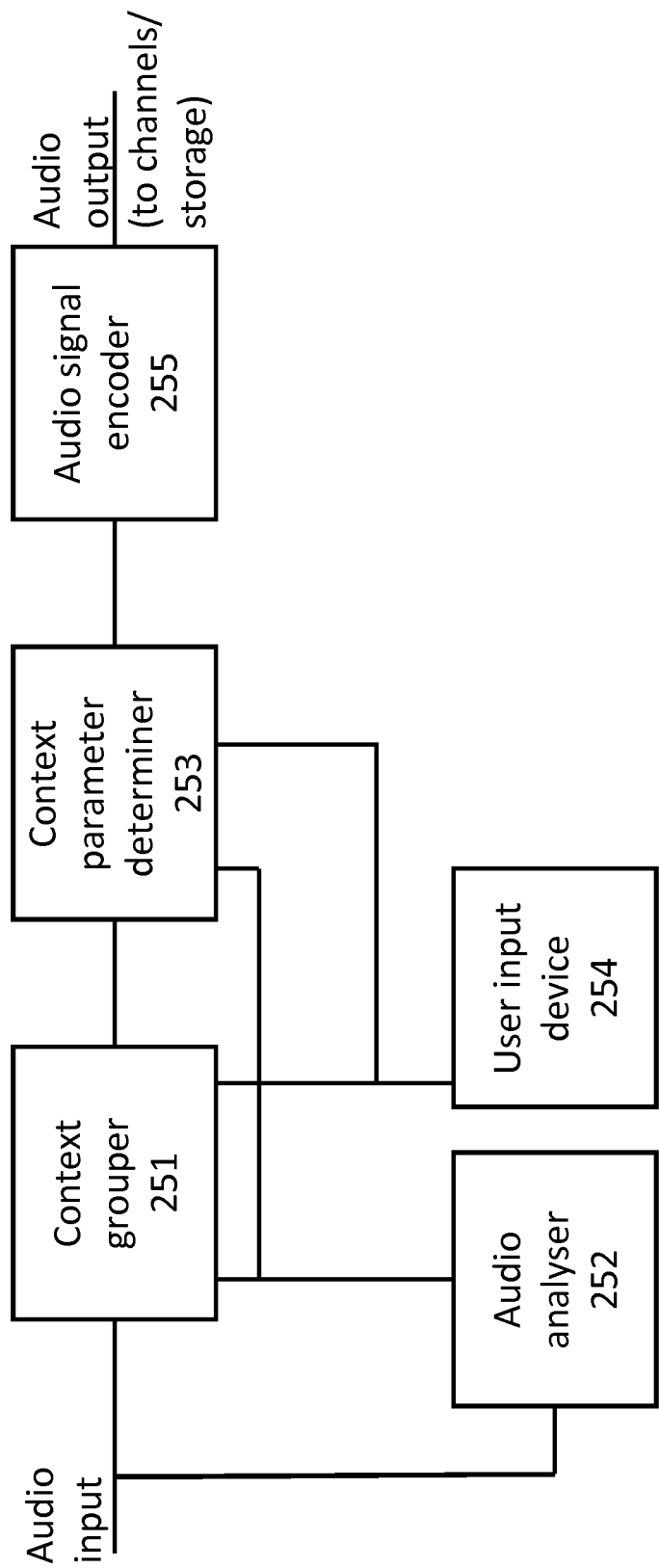
FIG. 2 shows a schematic view of a content generator/producer system for contextual group selection according to some embodiments.

With respect to FIG. 2 an example content creation/production apparatus according to some embodiments is shown. It would be understood that the apparatus may be implemented on any suitable hardware and software (or firmware) combination.

In some embodiments the apparatus is implemented by a digital audio workstation (DAW) with a VR user interface for the selection of contextual grouping of audio objects.

In some embodiments the apparatus may comprise a context grouper 251. The context grouper 251 may be configured to receive the audio input. The audio input in some embodiments comprises audio signals and associated metadata (such as audio object location, audio object type etc.). Furthermore in some embodiments the context grouper 251 may be configured to receive at least one grouping input. In the example shown in FIG. 2 the grouping input is provided from an audio analyser 252 and/or user input device 254.

In some embodiments the apparatus may comprise a user input device 254. The user input device 254 may be configured to allow a content creator to select a contextual grouping via an audio production UI implemented on the context grouper 251.

Figure 3:
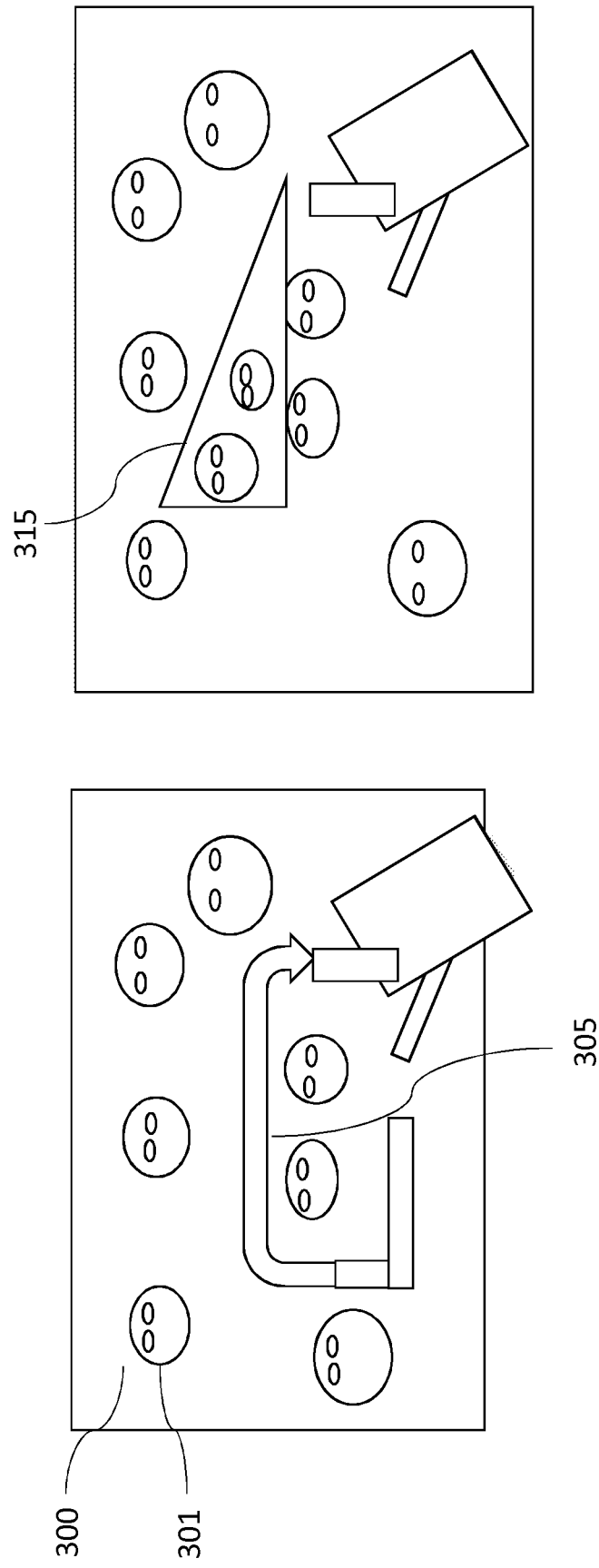
FIG. 3 shows an example of selecting a contextual group of audio objects.

For example FIG. 3 shows an example of the contextual grouping of audio objects. The user input device 254 which may a touch screen device may show an image 300 comprising a visual representation of the audio objects 301 located in the audio scene. A grouping of the displayed audio objects may be performed on the user input device in any suitable manner. For example as shown by the left side of FIG. 3 a user input is shown wherein a perimeter 305 surrounding the objects to be selected is drawn using the user's finger.

Having provided the user input as the grouping input in some embodiments the user input device 254 may be configured to show the group of selected audio objects as being different. For example as shown by the right side of FIG. 3 the selected audio objects are displayed in a lighter shade and highlighted by a grouping polygon (triangle).

In some embodiments the grouping input may be provided from an audio analyser 252. In some embodiments the apparatus comprises an audio analyser 252. The audio analyser 252 may be configured to analyse the audio input data, for example the audio signals and audio object location/type information and generate suitable context groups based on the analysis. Some potential examples may be where Electric guitar, drums, synthesizer and vocals could be grouped into a band, or where several vocals are grouped into a choir.

In some embodiments the apparatus comprises a context or parameter determiner 253. The context/parameter determiner 253 is configured to associate the selected or grouped audio objects in a manner such that there is a context to this group of Y audio objects. The selected audio objects act in a shared context, which does not affect the other objects that are not part of the group. The grouping may be seen for example as applying an "umbrella" that collects a certain set of audio objects under it.

Figure 4:
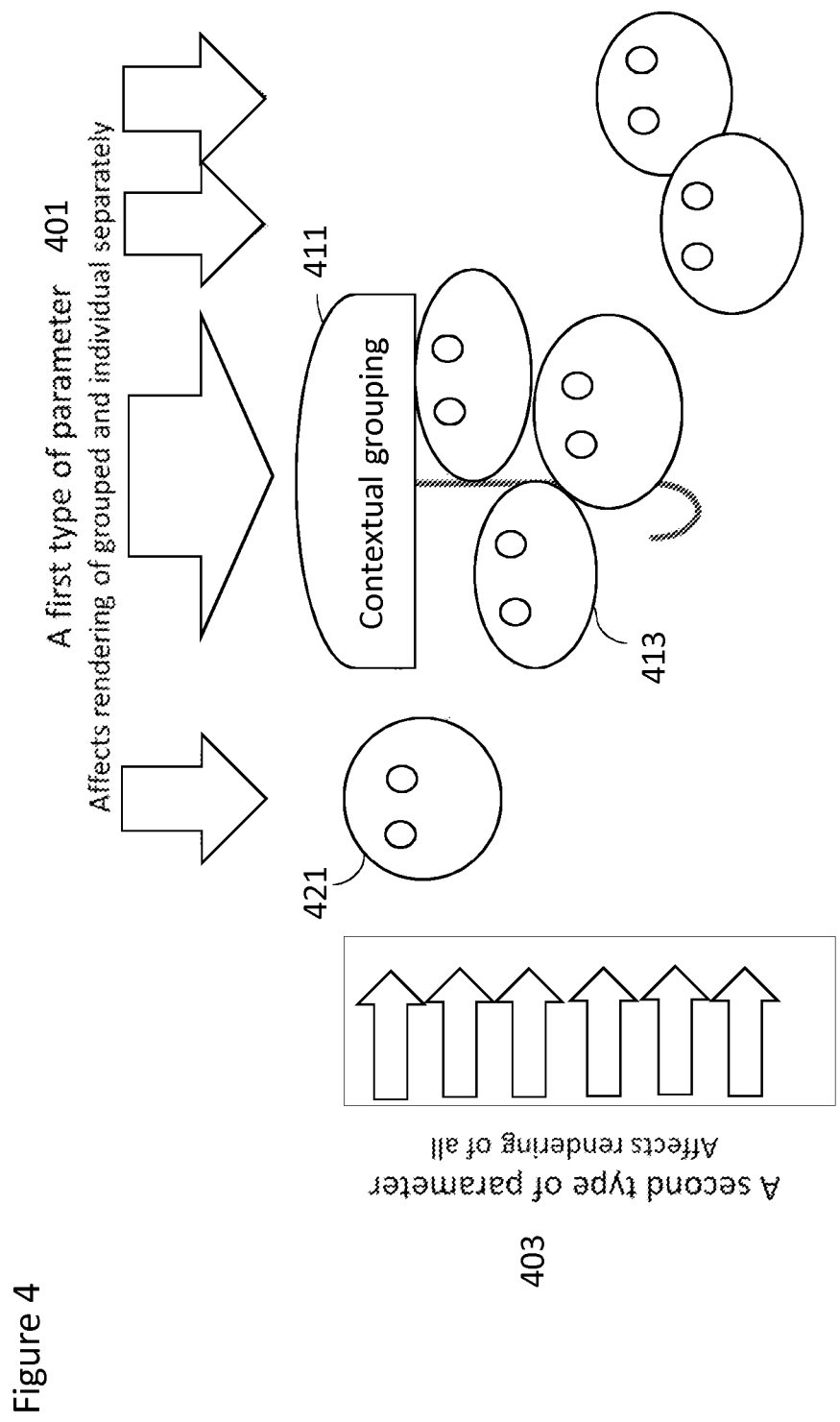
FIG. 4 shows an example contextual group selection as group filtering of audio objects.

This is shown for example in FIG. 4 wherein the "umbrella" 411 of the contextual grouping keeps away the "rain", in other words the selected Y audio objects 413 are shown as being protected from the first type of parameter 401 (or rendering rules) and as such the first type of parameter (or rendering rules) affects the grouped and individual parameter separately. Thus for example the selected Y audio objects 413 may be grouped such that a parameter or rule type is configured to be applied with respect to a common element associated with the Y audio objects rather than applied individually to each of the Z 'free' audio objects. An example of the first type of parameter 401 is volume, and specifically a volume which is dependent on the distance between the (listener) user and the individual object. As such the effect of the "umbrella" 411 is one wherein the volume of the contextually grouped audio objects 413 is determined relative to a common or reference point whereas the "free" audio objects 421 are individually affected by the distance dependent rule. In some embodiments the common element may be selected by the person controlling the audio production (or in some embodiments an automatic tool), and the information will then be part of the metadata stored and transmitted with the audio content. However in some embodiments the common element may be selected by a listener operating or controlling the rendering of the audio signal.

It is understood that in the same way that an umbrella does not protect its user from all the elements, analogously a second type of parameter or rendering rules in the 6DoF audio space affect the selected Y audio objects within the contextual group in the same manner as the Z "free" audio objects. An example of the second type of parameter 402 which affects the rendering of all audio objects is direction, and specifically a direction from the (listener) user to the audio object. As such the "umbrella" 411 has no effect with respect to the directional based rendering and is applied to the individual audio objects within the contextually grouped audio objects 413 and the "free" audio objects 421 according to the same rules.

In some embodiments the context or parameter determiner 253 is configured to receive an input which defines which parameter or parameter rule sets may be applied to which selected groups. Thus for example parameter determiner 253 may receive an input to associate the determined contextually grouped audio objects 413 in such a way that a distance based volume rendering rule for the group is based on a distance between a reference or common position and the user (listener) rather than the rule for other "free" audio objects which are subject to a distance based volume rendering where the volume of the of the audio signals is dependent of the distance between the audio object and the listener. In such an example the context or parameter determiner 253 either receives no signal or receives a signal indicating that direction based rendering rules are applied to individual audio objects for both the selected contextually grouped audio objects 413 and the "free" audio objects 421.

In some embodiments where there are more than one set of selected audio objects, or contextual groupings (which may exist at the same time or may partially overlap or exist at separate times), the contextual groupings may enable and disable the same or different parameters or rendering rules.

In some embodiments the context/parameter determiner 253 may associate or disassociate a parameter or rendering rule with the contextual grouping based on a context/parameter input from user input device 254 and/or the audio analyser 252.

In such a manner a contextual grouping can be used in some embodiments to maintain a single common volume level for the contextual group, while allowing for correct 6DoF rendering directions be applied. It is further noted that while a common rendering volume (based on the distance between the common or reference point and the user) may be defined via the contextual grouping, the contribution of each of the individual audio objects within that group may be controlled separately. For example the contribution of each of the individual audio objects may be determined by the content provider (artists) and producers using the user input device 254 or the audio analyser 252.

In some embodiments a contextual group common or reference point is defined or determined with respect to a type of parameter or parameter rule. The common or reference point may be determined in some embodiments by the context/parameter determiner 253 and furthermore the common or reference point may be determined based on an input from the user input device 254 or the audio analyser 252. Thus for example the common or reference point may be determined as the average location of the audio objects within the contextual grouping. In some embodiments the reference point is defined with respect to the rendering operation or apparatus. For example in some embodiments the common or reference point may be defined as the smallest distance of the listener user to any of the audio objects in the contextual group.

Figure 5:
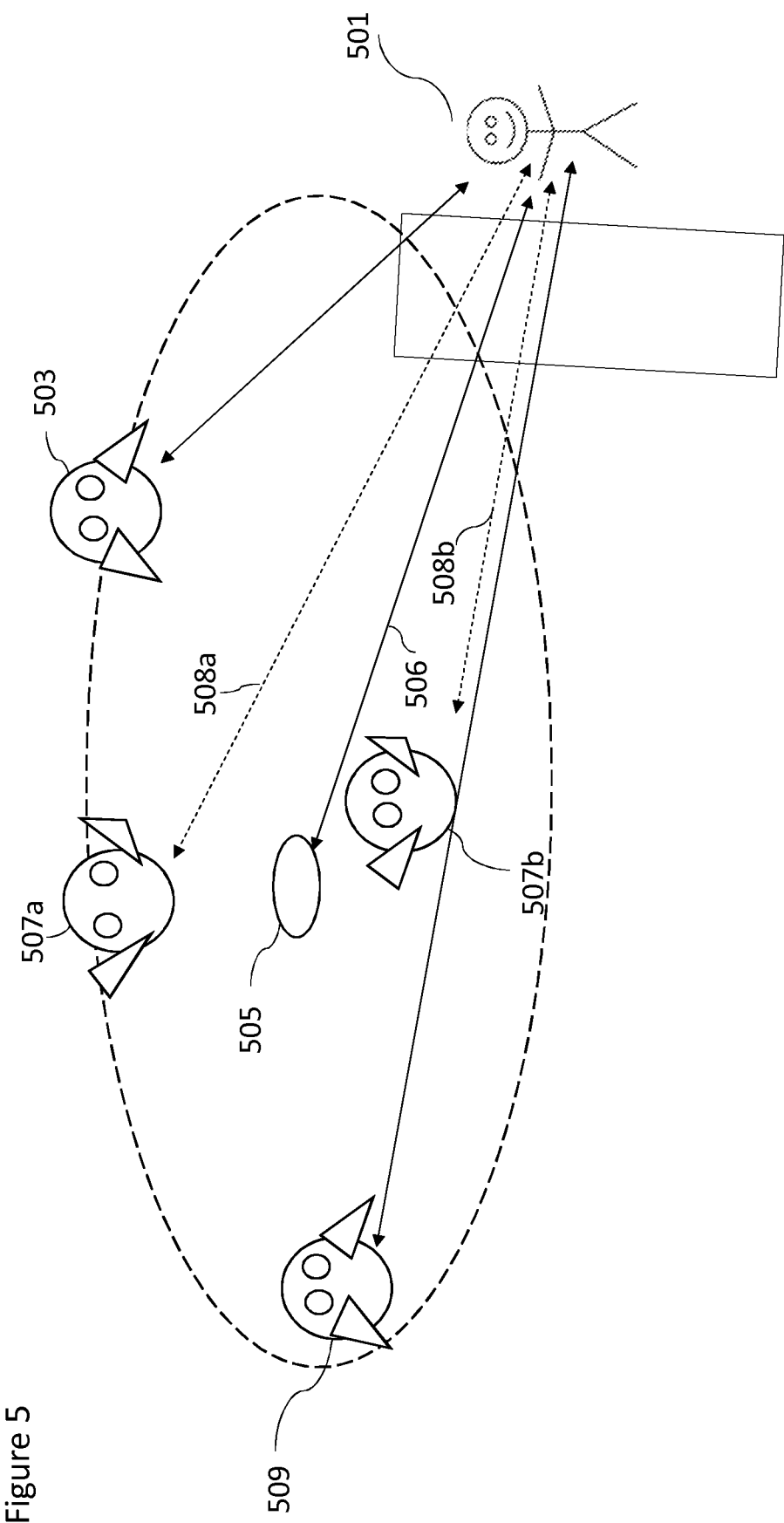
FIG. 5 shows an example of a contextual group reference point.

FIG. 5 shows an example of a contextual group reference point. FIG. 5 shows an audio scene comprising the audio objects 503, 507a, 507b, 509 and the user 501 listening to the audio scene. A contextual group comprising the audio objects 507a and 507b is defined. Furthermore the contextual group reference point 505 is shown. The contextual group reference point is a point according to which the parameters associated with the contextual group are applied. For example where the parameter is volume, the user 501 hears all audio objects 507a, 507b of the contextual group based on user-to-reference-point distance 506 rather than hearing the audio object 507a based on the user-to-object distance 508a and the audio object 507b based on the user-to-object distance 508b. In some embodiments, the reference point may be a reference area.

Figure 6:
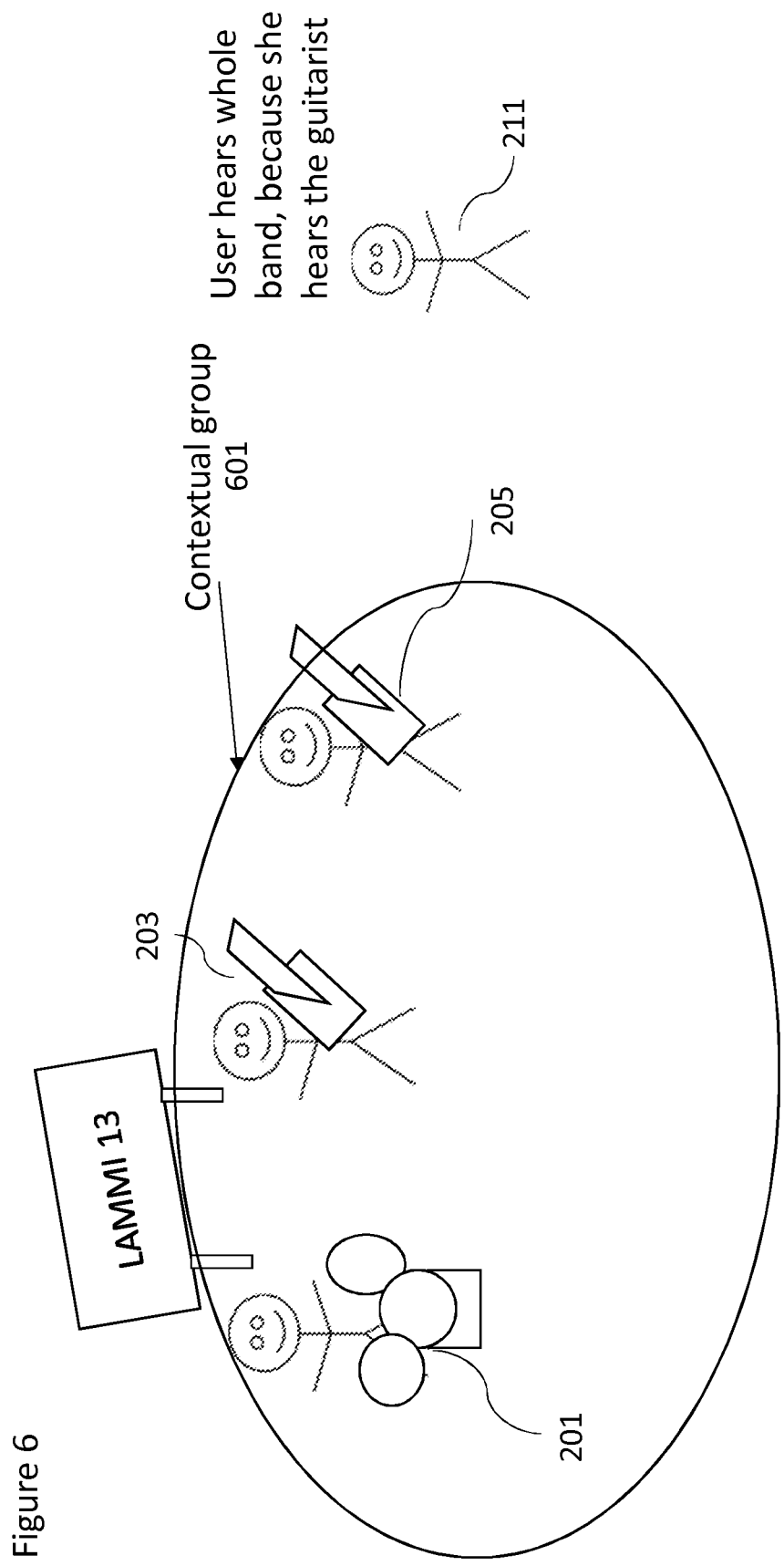
FIG. 6 shows an example effect of contextual group selection when applied to an example six degree of freedom environment.

With respect to FIG. 6, the example shown in FIG. 1c is shown but where the individual band members 201, 203, 205 are shown as having been selected as a contextual group 601. In such an example all of the audio objects are audible where the distance between the user 211 and the common distance (which may for example be the distance between the user 211 and the nearest band member 205) is an 'audible' distance or less.

As discussed above in some embodiments the definition of a contextual group may be time-varying. This means that a contextual grouping may be defined for a determined time period (for example from a first time to a second time). In other words the contextual group may exist at one point in time and may not exist at another point in time. The time-varying aspects of the contextual group may be defined in some embodiments by the context grouper 251 or by the context/parameter determined 253.

The effect of time-varying contextual groups and rendering operations may be such that a transition experienced by the user or listener between when the contextual group exists and does not exist is a controlled transition. The switch may be smooth, in other words, the change would generally not be abrupt on/off transition, but rather a parameter (such as volume) would be interpolated between its candidate values over a time period which may depend on the implementation or the content. Thus with respect to a volume parameter rule for a user positioned at one location close to the contextual group reference point, when the contextual group stops to exist, the user experiences an effect that appears as if some audio objects fade away (where the reference point distance is less than the individual audio object distance) and others may get louder (where the reference point distance is more than the individual audio object distance).

Furthermore in some embodiments the membership in the contextual group may also be time-varying. In other words an individual audio object may belong to a first contextual group at a first time instant, belong to no contextual group at a second time instant, and belong to a second contextual group at a third time instant.

Figure 7:
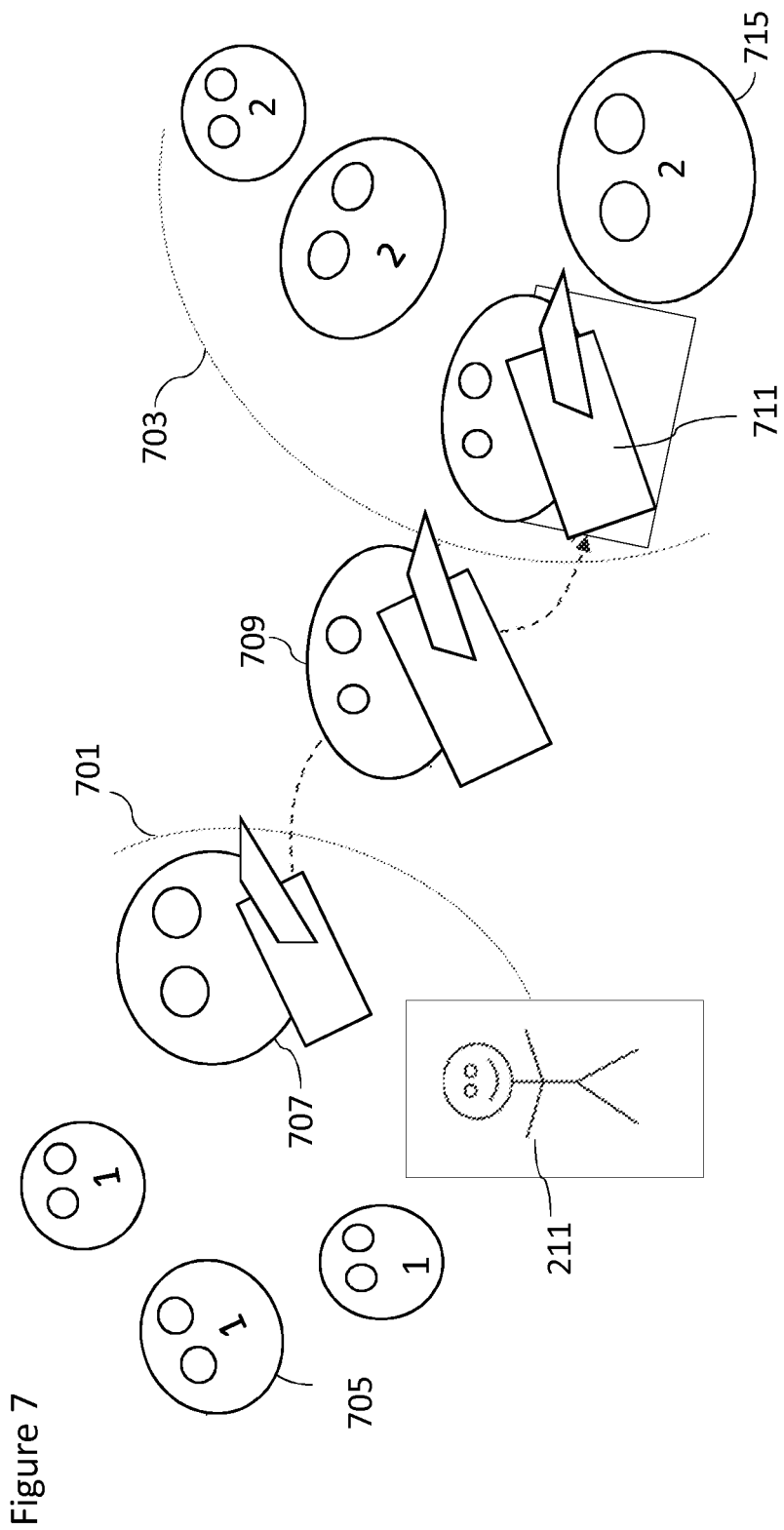
FIG. 7 shows an example spatial crossfade between two spatial audio signals.

FIG. 7 for example shows such an example. In FIG. 7 the user 211 is listening to an audio scene where two pieces of 6DoF music take place in different spatial locations. For example, the two pieces of 6DoF music may correspond to track 1 and track 2 of a conventional Compact Disc (CD). The first piece may begin to be presented when the user approaches the reference point of the contextual group 701 corresponding to the first piece. The contextual group 701 comprises the audio objects such as vocal object 705 and guitar solo object 707. The user 211 listens to this performance while moving in the vicinity of the reference point. A specific instrument track, such as a guitar solo object 707, may be used to transition the user from the first piece to the second piece. Thus, as the first piece is close to ending, the guitar solo object 707 may stop being part of the contextual group 701 and become a free guitar solo object 709. The free guitar solo object 709 begins to move away from the user 211, leading the user 211 from listening to the first piece at the first location to a second location. As the audio at the first contextual group 701 ends, the free guitar solo audio object 707 may already have become a guitar solo audio object 711 which is member of a second contextual group 703 (which also features new vocal object 715). The user 211 having followed the guitar thus can begin to hear the second piece.

In such a manner a new type of spatial crossfade, or outro/intro, can be defined.

Figure 8:
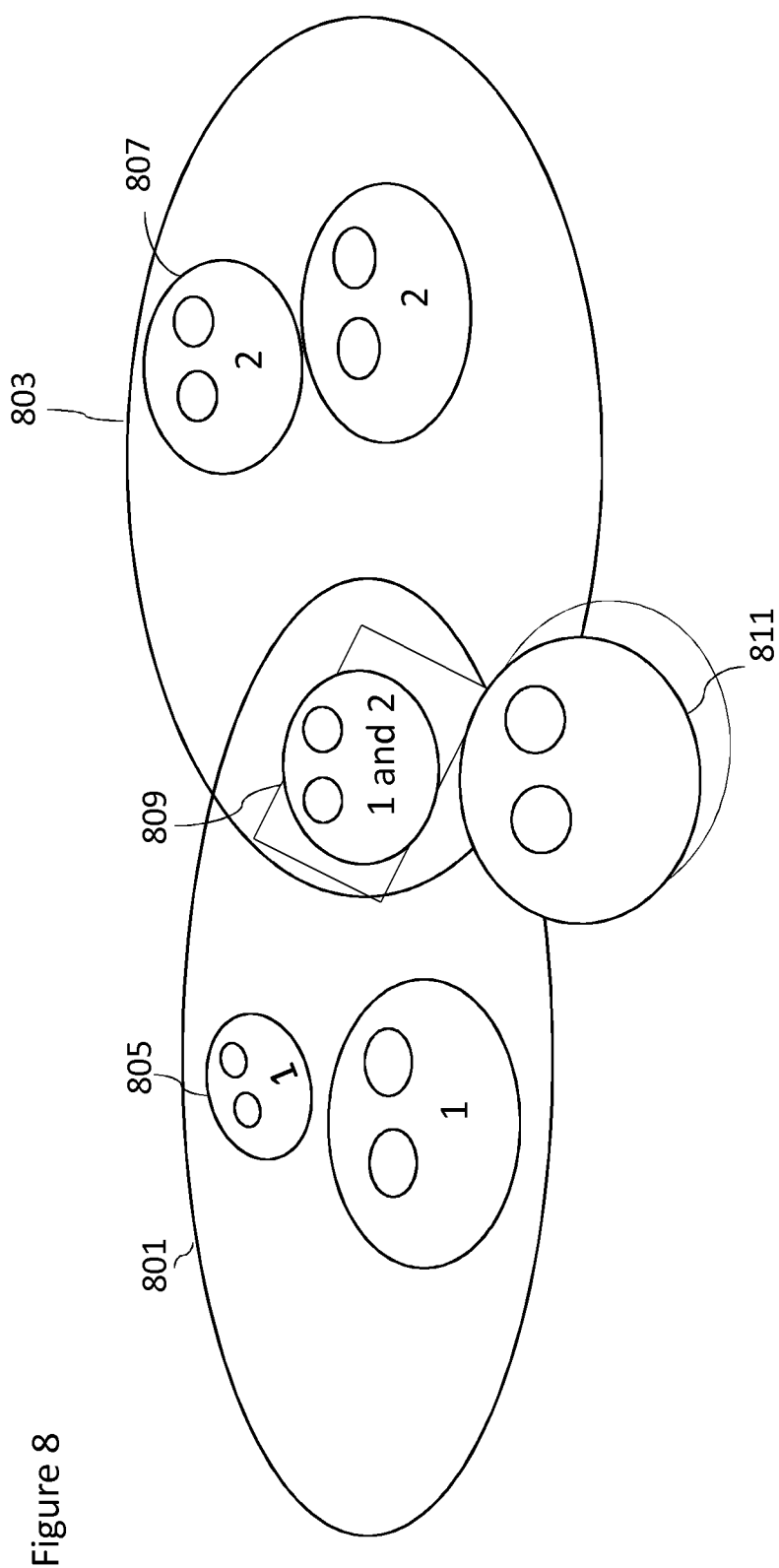
FIG. 8 shows an example of partially overlapping contextual groupings.

In some embodiments, an audio object may be part of at least two contextual groups at the same time. An example of this is shown in FIG. 8 wherein the audio scene comprises a first contextual group 801 which in turn comprises elements such as audio object 805, a second contextual group 803 which in turn comprises elements such as audio object 807 and at least one "free" audio object such as audio object 811. As shown in FIG. 8 the audio object 809 exists in both the first contextual group 801 and the second contextual group 803. There are various implementation options which may exploit the ability to associate or select an audio object for more than one contextual group. A first option is to define an active contextual group for the audio object. The contextual-group parameters (e.g., volume) for the audio object are then derived based on the rules/parameters from the active contextual group. In some embodiments the selection or determination of the active contextual group may be defined based on any suitable method. For example the active contextual group may be selected on a FIFO (first-in-first-out) principle. A second option in some embodiments is to base the rendering on the parameters themselves. For example to always render the audio object based on loudest group. In the same manner as described previously with respect to switching between time-varying contextual group settings, the switch between simultaneous contextual group renderings may be implemented as a smooth switch.

Having defined the contextual groupings, the rules/parameters which are affected by the contextual groupings (and/or the rules/parameters which are not affected by the contextual groupings), and any contextual grouping parameters (such as the reference or common point associated with the contextual grouping parameters), in some embodiments the contextual group properties may be exploited to allow for more efficient transport of the audio in order to save bandwidth and/or to optimize the audio performance when bandwidth is limited (bit rate scalability).

For example in some embodiments the apparatus may comprise an audio signal encoder 255 which is configured to receive the audio objects (the audio signals and the metadata associated with the audio objects) and the contextual grouping definitions and generate suitable audio signal outputs to be stored and/or transmitted.

These techniques may be useful for example when considering EDGE computing (mobile edge computing, MEC) in wireless networks.

The encoding may be a guided streaming or encoding of the contextual group audio objects. The encoding or streaming evaluates, for example, based on the available bit rate and content, at least two spatial zones relative to the user and the contextual group and free audio object positions. The at least two zones may be defined as 'far-field' and 'near-field'. In some embodiments there may be in addition further spatial zones, for example at least one transition zone between the at least two zones.

Figure 9:
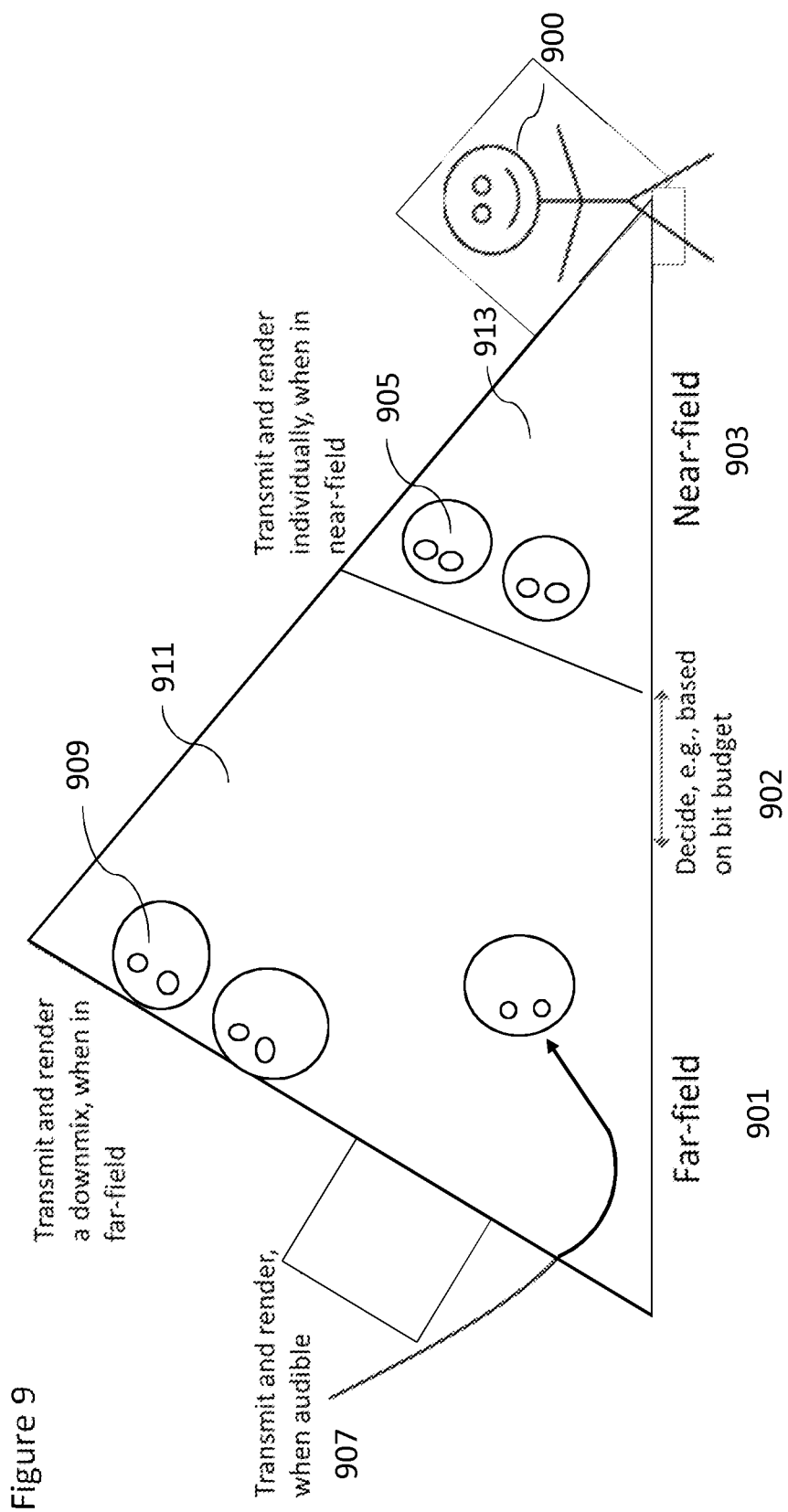
FIG. 9 shows an example of near-field and far-field contextual grouping down-mixing processing.

With respect to FIG. 9 an example of the at least two zones is shown. For the near-field zone 913 defined by the distance 903 from the user 900, the directions of the individual audio objects such as audio object 905 within the contextual group are important. Therefore, the audio signal encoder 255 may be configured to encode all the individual components of these audio objects so that the listener or user can receive all the individual components and have each of them rendered in their correct location. For the far-field zone 911 which is defined by the distance range 901 from the user 900, the exact directions for any contextually grouped audio objects such as object 909 are less important. As such the audio signal encoder 255 may be configured to encode a continuous, direction-based downmix of the individual audio objects belonging to the contextual group. This allows an encoding which uses less capacity or streams a lower rate representation of the audio to the user. However in such embodiments the direction-based downmix takes into account the user direction relative to the group. Therefore in some embodiments the audio encoder generates a continuous, direction-adaptive downmix. The near-field distance range 903 and far-field distance range 901 may be determined by a transition zone or threshold 902 which is determined based on the available bit rate/bit budget for the transmission/storage of all of the signals. In some embodiments between near-field distance range 903 and far-field distance range 901 defining the near-field zone 913 and the far-field zone 911 is a transition zone (not shown). The audio encoder in some embodiments may be further configured to transmit the non grouped audio objects, such as audio object 907, individually when the audio object is audible (based on the distance from the user and/or the orientation relative to the user. In such a manner in some embodiments the user 900 may be configured to receive at least one individual component and a downmix.

Figure 10:
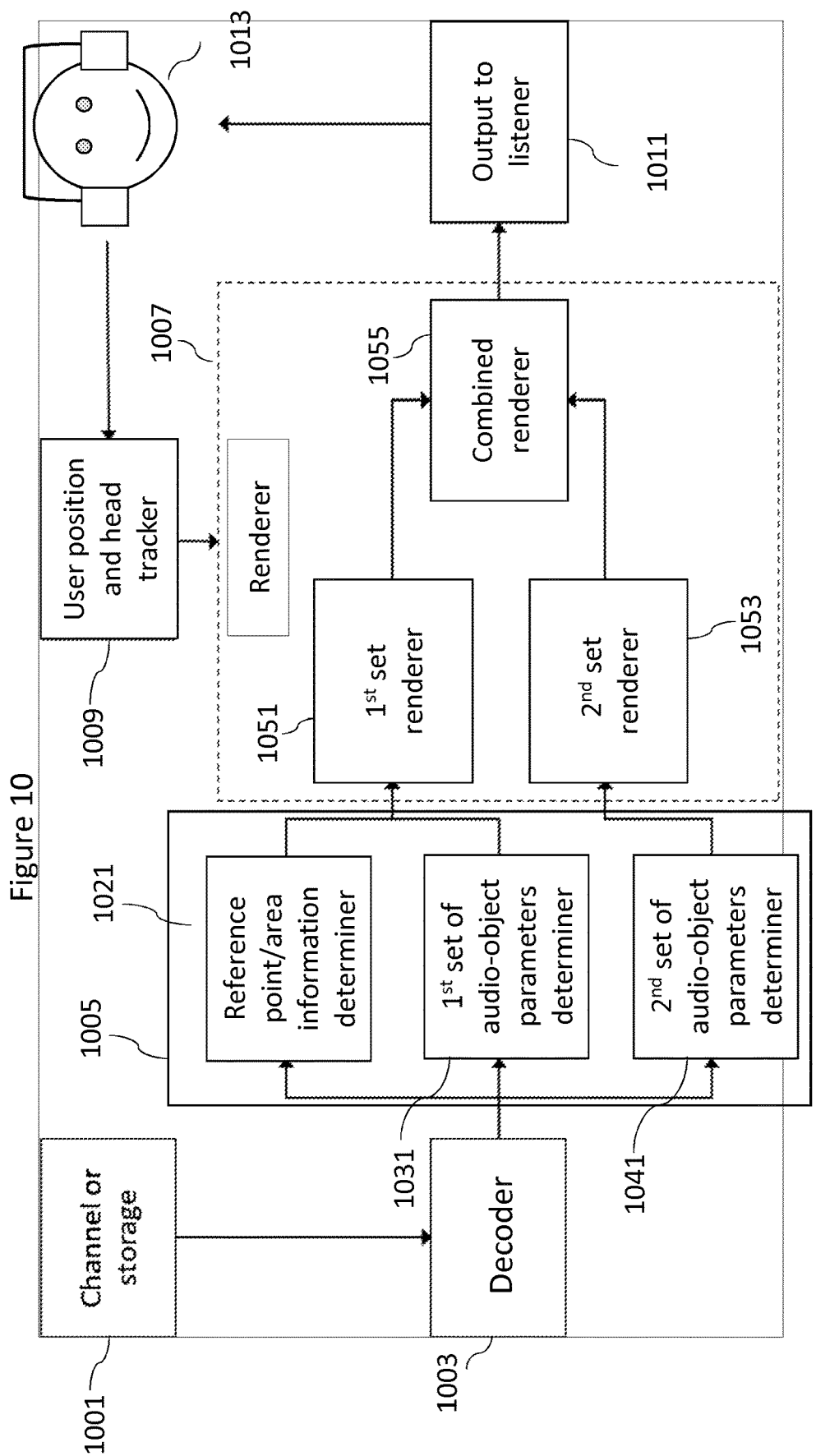
FIG. 10 shows schematically an example system suitable for implementing decoding rendering and outputting six degree of freedom audio according to some embodiments.

FIG. 10 shows an example rendering apparatus. The rendering apparatus is configured to receive from the channel or storage 1001 the encoded audio objects (the audio signals associated with the audio objects and the metadata including the defined contextual groups etc.). The encoded audio objects may be passed to a decoder 1003.

The rendering apparatus may comprise a decoder 1003. The decoder 1003 may be configure to receive the encoded audio object data and decode it and present it to a contextual group filter 1005.

The rendering apparatus may comprise a contextual group filter 1005. The contextual group filter 1005 is configured to receive the output from the decoder and filter the audio objects into "free" audio objects and contextually grouped audio objects.

In some embodiments the contextual group filter 1005 may comprise a first set of audio object parameter determiner 1031 which identifies the audio objects which are grouped according to at least one of the contextual groups and further determines the parameters/parameter rules associated with the audio objects. This information may then be passed to the renderer 1007 and specifically the first set renderer 1051.

Furthermore the contextual group filter 1005 may comprise a reference point/area information determiner 1021 which is configured to determine the reference/common point associated with at least one of the contextual groups and further passes this to the renderer 1007 and specifically the first set renderer 1051.

In some embodiments the contextual group filter 1005 may comprise a second set of audio object parameter determiner 1031 which identifies the "free" audio objects and passes this information to the renderer 1007 and specifically the second set renderer 1053.

The rendering apparatus may comprise a renderer 1007. The renderer may comprise a first set renderer 1051 configured to receive the audio object and other information about the contextual groups and generate a suitable audio signal rendering based on the contextual group information and the user position and orientation information. The renderer may comprise a second set renderer 1053 configured to receive the "free" audio object and other information and generate a suitable audio signal rendering based on the user position and orientation information.

The outputs of the first set renderer 1051 and second set renderer 1053 may be passed to a combined renderer 1055 where the renderings are combined and passed to a suitable output 1011.

The output 1011 may then output the rendered audio signals to the user 1013 to be presented, for example by headphone. Furthermore the user may be equipped with suitable 6DoF determination apparatus such as a user position and head tracker which provides a suitable output to the renderer 1007.

As such the rendering of each audio object is based on a combination of a first parameter rendering and a second parameter rendering (where one of the sets may be a zero rendering). The first set of audio-object parameters here refers to the parameters affected by the contextual group. Thus, the rendering according to these parameters depends only on the user position/rotation relative to the reference point or area. On the other hand, the second set of audio-object parameters affect the rendering of the audio object according to the user position/rotation relative to the audio object itself (the second set rendering contribution is thus in a sense similar to what prior art does. However, it is noted that these contributions are not separable.

It is not explicitly shown in FIG. 10 that when an audio-object rendering is triggered by at least one of the first or second set renderings, the other one also needs to be considered. This is because the first set of parameters may control, e.g., the volume of the audio object, while the second set of parameters may control, e.g., the position of the audio object. Of course, one contribution may be a zero contribution. This simply means that either an audio object is not part of any contextual group, or the audio object is fully defined through the contextual group (or the audio object is part of a contextual group and the group reference point/area fully corresponds to the audio object itself).

The embodiments as described herein enable a well-balanced 6DoF audio presentation, e.g., in musical experiences, where a single volume level can be applied to a piece of music consisting of several audio objects. As different parameters affecting the spatial rendering may be considered either individually or within the context of a group of audio objects, it is possible for the user to roam the 6DoF scene and hear audio sources spatially correctly yet at a volume level that represents the content creator's optimization.

Furthermore in some embodiments it is possible to control and produce new types of spatial crossfades between musical pieces, by enabling time-varying contextual grouping of audio objects.

The embodiments described above furthermore proposes a bandwidth optimization for the transmission of the audio objects within contextual groups. By specifying at least a near-field and far-field for the spatial rendering and utilizing a direction-sensitive downmix of the contextual groups in the far-field, the bit rate may be reduced without degrading the spatial reproduction quality for the user.

In not implementing the embodiments described herein the user experience may be compromised in several ways. Firstly it is not possible to apply a (time-varying) decoupling of a first set of an audio object's rendering parameters from a second set of rendering parameters such that the first set follows the rendering of an audio-object group render while the second set follows the rendering of the audio object's individual render. In practical terms is that a user in 6DoF, according to prior art, will for example hear the location and sound level of a static audio object changing according to a change in user's own listening position. While this is the expectation of a realistic rendering, it is not the correct/preferred rendering in many use cases.

Secondly, when not implementing the embodiments described herein the user experience can be compromised in a congested channel by an unoptimal quality degradation due to reduced bit rate and/or by leaving out too many audio objects. This happens because, prior art does not offer the near-field/far-field spatial downmix of the audio-object contextual group. This mechanism described herein allows for a new way to balance the quality degradation by controlling the distance at which spatial downmix is performed for the contextual group.

Considering the above, we note that the spatial audio rendering presented to the user according to the invention may in some use cases require transmission of more audio sources than previously. This follows from the fact that the user should be able to hear such audio objects that are part of a contextual group the user is hearing even if said individual audio objects would otherwise not be rendered to the user due to their distance.

Furthermore in implementing such embodiments it is possible for a user to move to a location that is away from other audio objects that might disturb listening to the band in the VR scene. The chosen location may not be in the traditional sweet spot for listening to the band yet the user may be able to enjoy "sweet spot quality" music.

In the examples shown above the 6DoF system may be based on a 'live' or real life event and a recording thereof. In some embodiments the downmix may be the same that was used in the live event. Furthermore in some embodiments the downmix may be played back from loudspeakers.

Figure 11:
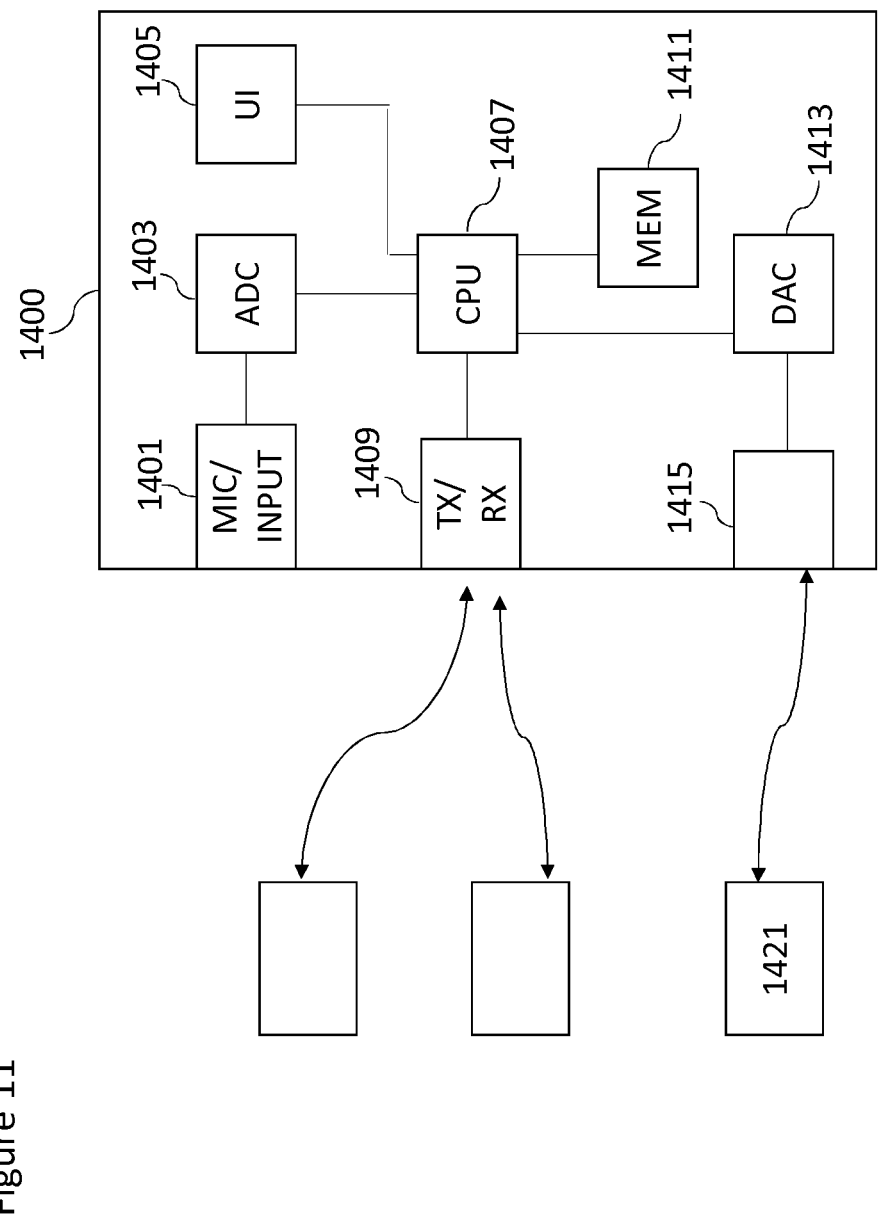
FIG. 11 shows schematically an example device suitable for implementing the apparatus shown above according to some embodiments.

With respect to FIG. 11 an example electronic device which may be used as the capture device and/or audio signal analyser/processor and/or playback device is shown. The device may be any suitable electronics device or apparatus. For example in some embodiments the device 1400 is a mobile device, user equipment, tablet computer, computer, audio playback apparatus, etc.

The device 1400 may comprise a microphone or microphone array 1401. The microphone or microphone array 1401 may comprise a plurality (for example a number N) of microphone elements. However it is understood that there may be any suitable configuration of microphones and any suitable number of microphones. In some embodiments the microphone or microphone array 1401 is separate from the apparatus and the audio signal transmitted to the apparatus by a wired or wireless coupling. The microphone or microphone array 1401 may in some embodiments be the microphone array as shown in the previous figures.

The microphone or microphone array may comprise transducers configured to convert acoustic waves into suitable electrical audio signals. In some embodiments the microphone or microphone array may comprise solid state microphones. In other words the microphones may be capable of capturing audio signals and outputting a suitable digital format signal. In some other embodiments the microphone or microphone array 1401 can comprise any suitable microphone type or audio capture means, for example condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone or microphone array can in some embodiments output the audio captured signals to an analogue-to-digital converter (ADC) 1403.

The device 1400 may further comprise an analogue-to-digital converter 1403. The analogue-to-digital converter 1403 may be configured to receive the audio signals from each microphone 1401 and convert them into a format suitable for processing. In some embodiments where the microphone or microphone array comprises integrated microphone the analogue-to-digital converter is not required. The analogue-to-digital converter 1403 can be any suitable analogue-to-digital conversion or processing means. The analogue-to-digital converter 1403 may be configured to output the digital representations of the audio signals to a processor 1207 or to a memory 1411.

In some embodiments the device 1400 comprises at least one processor or central processing unit 1207. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some implements the device 1400 comprises a transceiver 1409. The transceiver 1409 in such embodiments can be coupled to the processor 1407 and configured to enable a communication with other apparatus or electronic devices, for example via a wireless communications network. The transceiver 1409 or any suitable transceiver or transmitter and/or receiver means can in some embodiments be configured to communicate with other electronic devices or apparatus via a wire or wired coupling.

For example the transceiver 1409 may be configured to communicate with the renderer as described herein.

The transceiver 1409 can communicate with further apparatus by any suitable known communications protocol. For example in some embodiments the transceiver 1409 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the device 1400 may be employed as at least part of the audio processor. As such the transceiver 1409 may be configured to receive the audio signals and positional information from the capture device microphones or microphone array and in some embodiments determine the parameters as described herein by using the processor 1407 executing suitable code. Furthermore the device may generate a suitable audio signal and parameter output to be transmitted to the renderer or spatial processing device.

In some embodiments the device 1400 may be employed as at least part of the renderer. As such the transceiver 1409 may be configured to receive the audio signals from the microphones or microphone array and in some embodiments the parameters determined at the capture device or processing device as described herein, and generate a suitable audio signal rendering by using the processor 1407 executing suitable code. The device 1400 may comprise a digital-to-analogue converter 1413. The digital-to-analogue converter 1413 may be coupled to the processor 1407 and/or memory 1411 and be configured to convert digital representations of audio signals (such as from the processor 1407 following an audio rendering of the audio signals as described herein) to a suitable analogue format suitable for presentation via an audio subsystem output. The digital-to-analogue converter (DAC) 1413 or signal processing means can in some embodiments be any suitable DAC technology.

Furthermore the device 1400 can comprise in some embodiments an audio subsystem output 1415. An example as shown in FIG. 11 shows the audio subsystem output 1415 as an output socket configured to enabling a coupling with headphones 1421. However the audio subsystem output 1415 may be any suitable audio output or a connection to an audio output. For example the audio subsystem output 1415 may be a connection to a multichannel speaker system.

In some embodiments the digital to analogue converter 1413 and audio subsystem 1415 may be implemented within a physically separate output device. For example the DAC 1413 and audio subsystem 1415 may be implemented as cordless earphones communicating with the device 1400 via the transceiver 1409.

Although the device 1400 is shown having both audio capture, audio processing and audio rendering components, it would be understood that in some embodiments the device 1400 can comprise just some of the elements.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   defining, for at least one time period, at least one contextual grouping comprising at least two of a plurality of audio objects within an audio scene and at least one non-grouped audio object of the plurality of audio objects outside of the at least one contextual grouping; and
   defining at least one first parameter and/or parameter rule type which is configured to be applied to the contextual grouping with respect to a distance between a user and a common element, a reference point, or a reference area, associated with the at least two of the plurality of audio objects, and applied individually to respective ones of the at least one non-grouped audio object outside of the at least one contextual grouping, wherein the common element, the reference point, or the reference area is determined by a user input or an audio analyzer,
   wherein the at least one first parameter and/or parameter rule type is applied in a six degrees of freedom free-viewpoint audio rendering of the plurality of audio objects including the at least one contextual grouping comprising at least two audio objects and the at least one non-grouping audio object during the at least one time period, and wherein the at least one contextual grouping defines a spatial rendering of the at least two of the plurality of audio objects that differs from a spatial rendering of the at least one non-grouped audio object.

2. The method as claimed in claim 1, further comprising:
   defining with respect to the at least one contextual grouping at least one second parameter and/or second parameter rule type configured to be applied with respect to individual elements associated with the at least two of the plurality of audio objects in audio rendering of the at least two of the plurality of audio objects; and
   defining the at least one second parameter and/or second parameter rule type that is configured to be applied with respect to individual elements associated with the at least one non-grouped audio object of the plurality of audio objects outside of the at least one contextual grouping.

3. The method as claimed in claim 1, further comprising:
defining for at least one further time period at least one further contextual grouping comprising a further at least two of the plurality of audio objects; and
defining with respect to the at least one further contextual grouping at least one further first parameter and/or further parameter rule type which is configured to be applied with respect to a further common element, further reference point, or further reference area associated with the further at least two of the plurality of audio objects in audio rendering of the further at least two of the plurality of audio objects.

4. The method as claimed in claim 3, wherein the at least two of the plurality of audio objects and the further at least two of the plurality of audio objects comprises at least one audio object in common.

5. The method as claimed in claim 4, further comprising selecting for the at least one audio object in common one of:
the at least one parameter and/or parameter rule type, to be applied with respect to the common element reference point, or reference area associated with the at least two of the plurality of audio objects; or
the at least one further parameter and/or further parameter rule type, to be applied with respect to the further common element, further reference point, or further reference area associated with the further at least two of the plurality of audio objects, based on at least one of:
a volume determination; and
a prior contextual grouping of the at least one additional contextual grouping and the at least one contextual grouping.

6. The method as claimed in claim 1, further comprising encoding a downmix of audio signals associated with the at least one contextual grouping based on at least one of:
a distance within an audio scene relative to a rendering location; and
a orientation of the at least one contextual grouping relative to a rendering location.

7. The method as claimed in claim 1, further comprising:
defining the common element reference point, or reference area with respect to the at least one contextual grouping; and
transmitting and/or storing the defined common element, reference point, or reference area and audio signals associated with the at least two of the plurality of audio objects.

8. A method for rendering audio signals associated with a plurality of audio objects within at least one audio scene, the method comprising:
determining, for at least one time period, at least one contextual grouping comprising at least two of the plurality of audio objects and at least one non-grouped audio object of the plurality of audio objects outside of the at least one contextual grouping;
determining with respect to the at least one contextual grouping at least one first parameter and/or parameter rule type;
determining at least one common element, reference point, or reference area associated with the at least two audio objects of the at least one contextual grouping, wherein the at least one common element, reference point, or reference area is determined by a user input or an audio analyzer;
rendering audio signals associated with the at least two of the plurality of audio objects by applying the at least one first parameter and/or parameter rule type with respect to a distance between a user and the at least one common element, reference point, or reference area to audio signals associated with each of the at least two of the plurality of audio objects;
rendering audio signals associated with the at least one non-grouped audio object of the plurality of audio objects outside of the at least one contextual grouping by applying the at least one first parameter and/or parameter rule type individually to respective ones of the audio signals associated with the at least one non-grouped audio object; and
combining the rendering of audio signals associated with the at least two of the plurality of audio objects with the rendering of audio signals associated with the at least one non-grouped audio object of the plurality of audio objects outside of the at least one contextual grouping for a six degrees of freedom free-viewpoint audio rendering during the at least one time period,
wherein the at least one contextual grouping defines a spatial rendering of the at least two of the plurality of audio objects that differs from a spatial rendering of the at least one non-grouped audio object.

9. The method as claimed in claim 8, further comprising:
determining at least one second parameter and/or second parameter rule type;
rendering audio signals associated with the at least two of the plurality of audio objects and the at least one non-grouped audio object of the plurality of audio objects outside of the at least one contextual grouping by applying the at least one second parameter and/or second parameter rule type with respect to individual elements associated with each audio object to audio signals associated with each audio object; and
combining rendering audio signals associated with the at least two of the plurality of audio objects and the at least one non-grouped audio object of the plurality of audio objects outside of the at least one contextual grouping with the combined rendering.

10. The method as claimed in claim 8, further comprising determining a downmix of audio signals associated with the at least one contextual grouping, wherein applying the at least one first parameter and/or parameter rule type with respect to the common element reference point, or reference area to audio signals associated with the at least two of the plurality of audio objects comprises applying the at least one first parameter and/or parameter rule type with respect to the common element, reference point, or reference area to the downmix of audio signals associated with the at least two of the plurality of audio objects.

11. An apparatus for audio signal processing audio objects within at least one audio scene, the apparatus comprising at least one processor and a memory storing program code, the at least one processor is configured, upon execution of the program code, to:
define, for at least one time period, at least one contextual grouping comprising at least two of a plurality of audio objects within an audio scene and at least one non-grouped audio object of the plurality of audio objects outside of the at least one contextual grouping; and
define at least one first parameter and/or parameter rule type which is configured to be applied to the contextual grouping with respect to a distance between a user and a common element, a reference point, or a reference area associated with the at least two of the plurality of audio objects and applied individually to respective ones of the at least one non-grouped audio object outside of the at least one contextual grouping, wherein the common element, the reference point, or the reference area is determined by a user input or an audio analyzer, wherein the at least one first parameter and/or parameter rule type is applied in a six degrees of freedom free-viewpoint audio rendering of the plurality of audio objects including the at least one contextual grouping comprising at least two audio objects and the at least one non-grouping audio object during the at least one time period, and wherein the at least one contextual grouping defines a spatial rendering of the at least two of the plurality of audio objects that differs from a spatial rendering of the at least one non-grouped audio object.

12. The apparatus as claimed in claim 11, the at least one processor further configured to:
define with respect to the at least one contextual grouping at least one second parameter and/or second parameter rule type configured to be applied with respect to individual elements associated with the at least two of the plurality of audio objects in audio rendering of the at least two of the plurality of audio objects; and
define the at least one second parameter and/or second parameter rule type that is configured to be applied with respect to individual elements associated with the at least one non-grouped audio object of the plurality of audio objects outside of the at least one contextual grouping.

13. The apparatus as claimed in claim 11, wherein the at least one processor is further configured to:
define for at least one further time period at least one further contextual grouping comprising a further at least two of the plurality of audio objects; and
define with respect to the at least one further contextual grouping at least one further first parameter and/or further parameter rule type which is configured to be applied with respect to a further common element, further reference point, or further reference area associated with the further at least two of the plurality of audio objects in audio rendering of the further at least two of the plurality of audio objects.

14. The apparatus as claimed in claim 13, wherein the at least two of the plurality of audio objects and the further at least two of the plurality of audio objects comprises at least one audio object in common.

15. An apparatus for rendering audio signals associated with a plurality of audio objects within at least one audio scene, the apparatus comprising at least one processor and a memory storing program code, the at least one processor is configured, upon execution of the program code, to:
determine for at least one time period at least one contextual grouping comprising at least two of the plurality of audio objects and at least one non-grouped audio object of the plurality of audio objects outside of the at least one contextual grouping;
determine with respect to the at least one contextual grouping at least one first parameter and/or parameter rule type;
determine at least one common element, reference point, or reference area associated with the at least two audio objects of the at least one contextual grouping, wherein the at least one common element, reference point, or reference area is determined by a user input or an audio analyzer;

render audio signals associated with the at least two of the plurality of audio objects by applying the at least one first parameter and/or parameter rule type with respect to a distance between a user and the at least one common element, reference point, or reference area to audio signals associated with each of the at least two of the plurality of audio objects;
render audio signals associated with the at least one non-grouped audio object of the plurality of audio objects outside of the at least one contextual grouping by being configured to apply the at least one first parameter and/or parameter rule type individually to respective ones of the audio signals associated with the at least one non-grouped audio object; and
combine the rendered audio signals associated with the at least two of the plurality of audio objects with the rendered audio signals associated with the at least one non-grouped audio object of the plurality of audio objects outside of the at least one contextual grouping for a six degrees of freedom free-viewpoint audio rendering during the at least one time period,
wherein the at least one contextual grouping defines a spatial rendering of the at least two of the plurality of audio objects that differs from a spatial rendering of the at least one non-grouped audio object.

16. The apparatus as claimed in claim 15, wherein the processor is further configured to:
determine at least one second parameter and/or second parameter rule type;
render audio signals associated with the at least two of the plurality of audio objects and the at least one non-grouped audio object of the plurality of audio objects outside of the at least one contextual grouping by being configured to apply the at least one second parameter and/or second parameter rule type with respect to individual elements associated with each audio object to audio signals associated with each audio object; and
combine rendered audio signals associated with the at least two of the plurality of audio objects and the at least one non-grouped audio object of the plurality of audio objects outside of the at least one contextual grouping with the combined rendering.

17. The apparatus as claimed in claim 15, wherein the processor is further configured to determine a downmix of audio signals associated with the at least one contextual grouping, wherein the processor configured to apply the at least one first parameter and/or parameter rule type with respect to the common element, reference point, or reference area to audio signals associated with the at least two of the plurality of audio objects is further configured to apply the at least one first parameter and/or parameter rule type with respect to the common element, reference point, or reference area to the downmix of audio signals associated with the at least two of the plurality of audio objects.

18. The method as claimed in claim 1, wherein the at least one contextual grouping results in a change to a six degrees of freedom free-viewpoint audio rendering of the at least two of the plurality of audio objects within the audio scene, but does not result in a change to the six degrees of freedom free-viewpoint audio rendering of the at least one non-grouped audio object.

19. The method as claimed in claim 1, wherein the at least one contextual grouping is determined by an audio analyzer based on audio signals of the at least two of the plurality of audio objects within the audio scene and one or more locations or one or more object types of the at least two of the plurality of audio objects within the audio scene.

* * * * *

UNITED STATES PATENT AND TRADEMARK OFFICE
CERTIFICATE OF CORRECTION

PATENT NO. : 11,570,564 B2
APPLICATION NO. : 16/753698
DATED : January 31, 2023
INVENTOR(S) : Lasse Laaksonen et al.

It is certified that error appears in the above-identified patent and that said Letters Patent is hereby corrected as shown below:

In the Claims

In Column 21, Line 24, Claim 5, delete "element" and insert -- element, --, therefor.

In Column 21, Line 44, Claim 7, delete "element" and insert -- element, --, therefor.

In Column 22, Line 46, Claim 10, delete "element" and insert -- element, --, therefor.

Signed and Sealed this
Twenty-ninth Day of August, 2023

Katherine Kelly Vidal
*Director of the United States Patent and Trademark Office*